June 21, 1927.                                                        1,632,926
                                D. SCOTT
          MEANS FOR SUPPLYING LIQUID FUEL TO INTERNAL COMBUSTION ENGINES
                         Filed Sept. 17, 1925           4 Sheets-Sheet 1
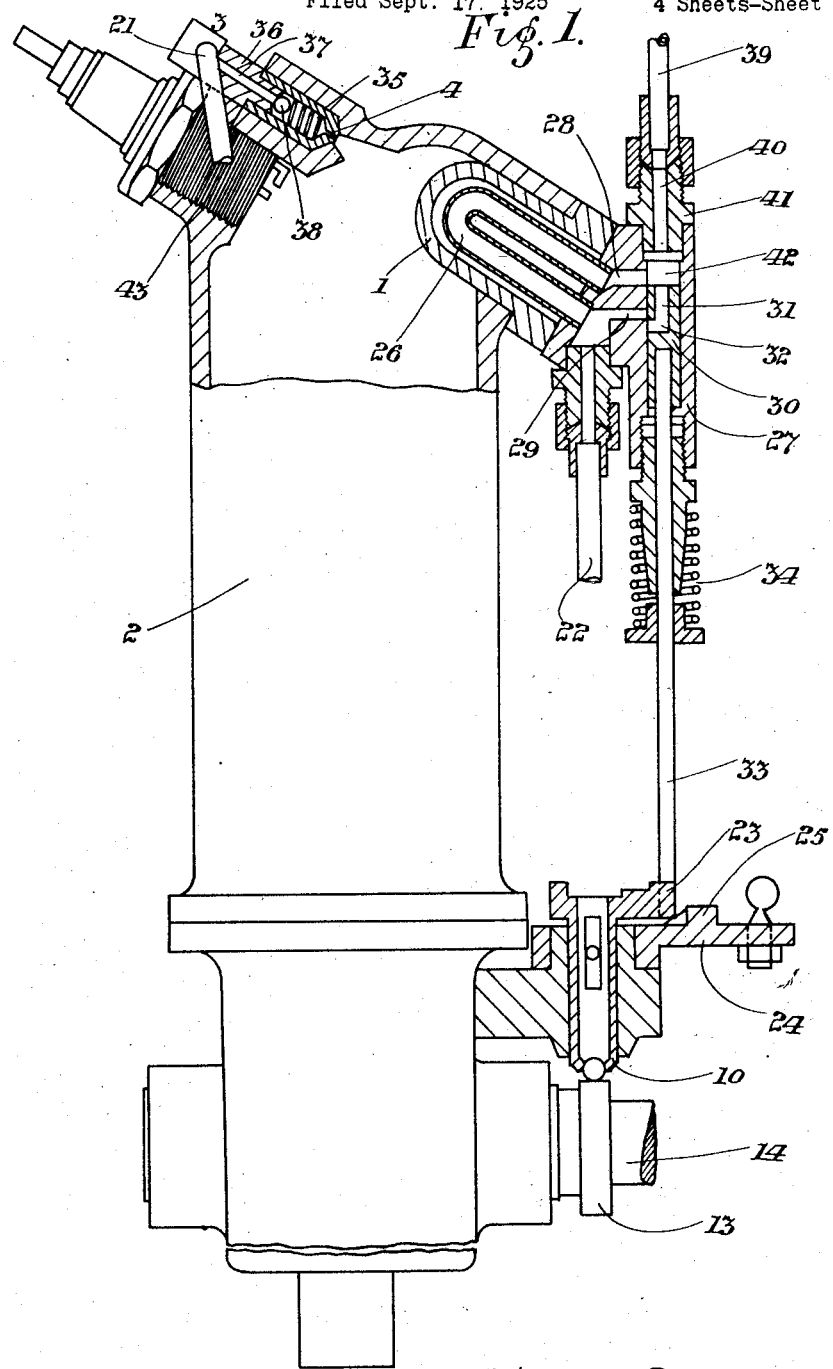

June 21, 1927. 1,632,926
D. SCOTT
MEANS FOR SUPPLYING LIQUID FUEL TO INTERNAL COMBUSTION ENGINES
Filed Sept. 17, 1925    4 Sheets-Sheet 2
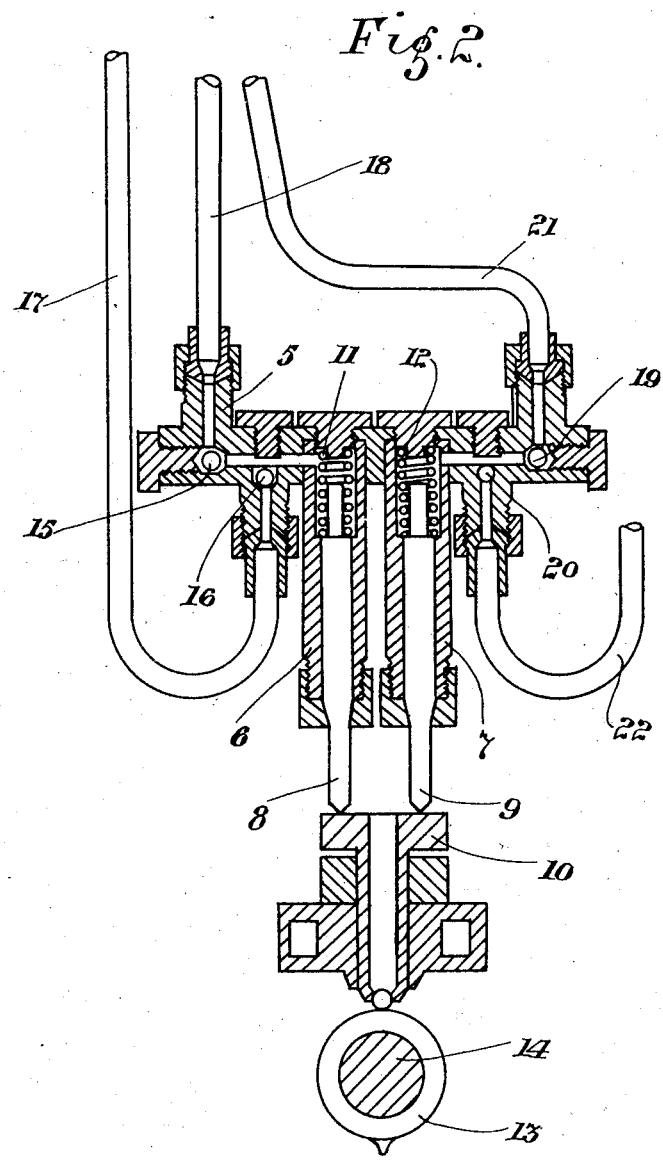

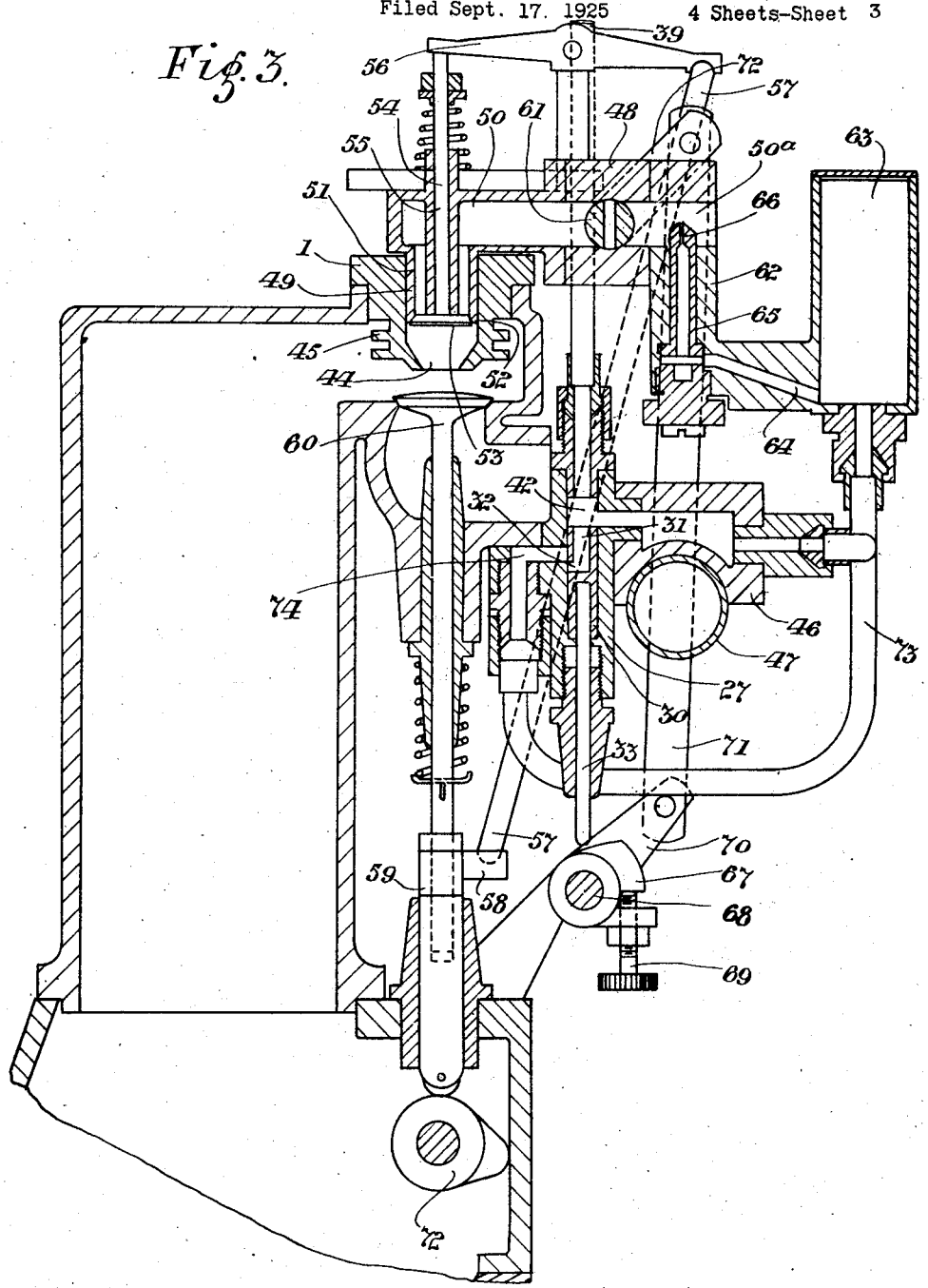

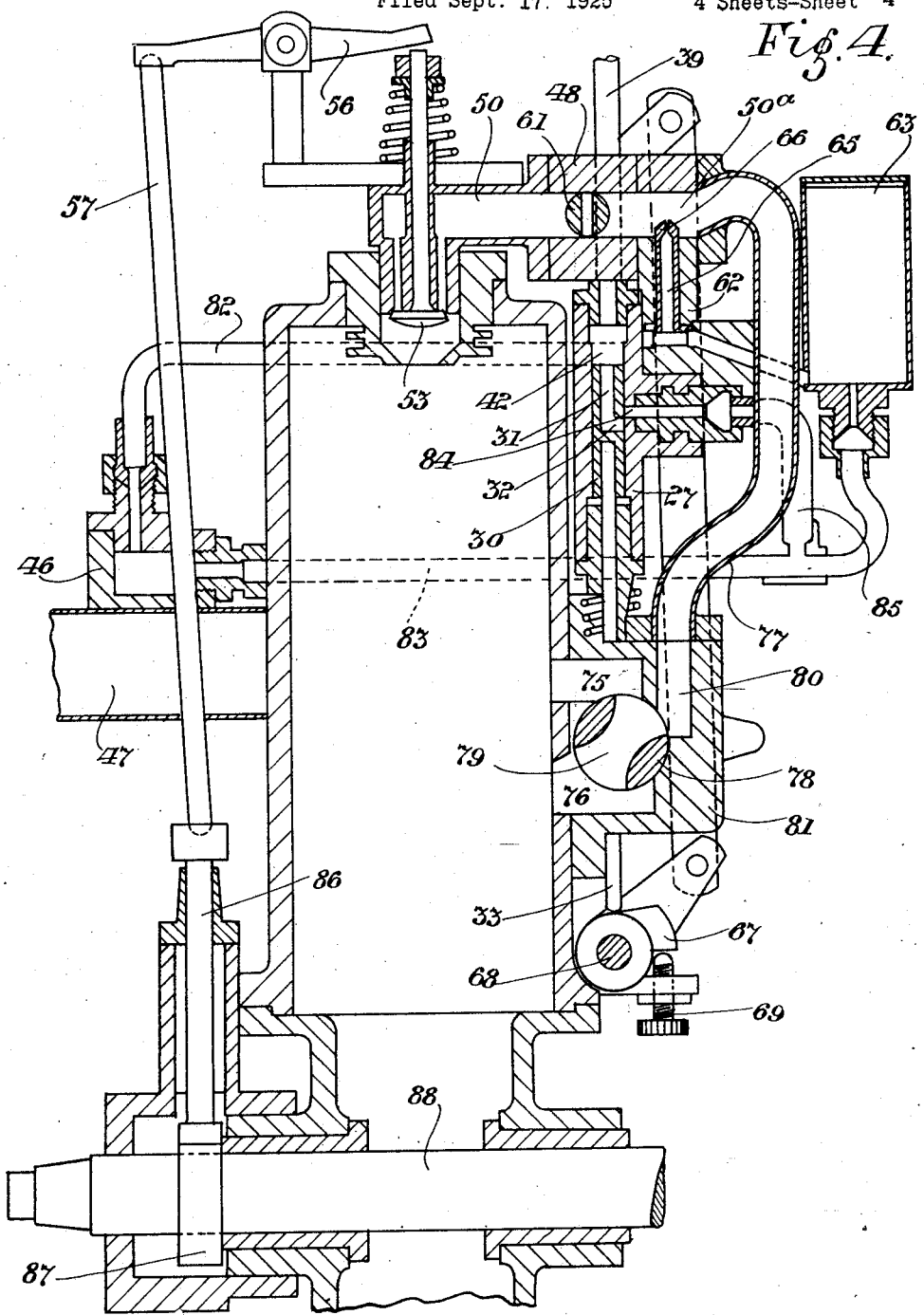

Patented June 21, 1927.

1,632,926

UNITED STATES PATENT OFFICE.

DONALD SCOTT, OF GLASGOW, SCOTLAND.

MEANS FOR SUPPLYING LIQUID FUEL TO INTERNAL-COMBUSTION ENGINES.

Application filed September 17, 1925, Serial No. 56,836, and in Great Britain September 20, 1924.

This invention relates to that type of internal combustion engine which is adapted to be started on fuel of low specific gravity, such as petrol, and to run on fuel of heavy specific gravity admitted, after preheating in means heated by the heat of the engine, to the, or each, cylinder of the engine in contact with a member heated by the heat of combustion in the interior of the cylinder, whereby said fuel is vaporized prior to its ignition by means of an ignition device.

An engine of the above type has been proposed in which the heavy fuel is pre-heated by being caused to flow through a coil disposed in a casing into which the hot engine exhaust gases are admitted, valve means being provided whereby some of said gases can be short-circuited so as to regulate the temperature to which the oil flowing through the heating coil is subjected.

The object of the present invention is to provide an improved engine of the type referred to, wherein the heavy fuel on which the engine runs will be fully vaporized prior to its ignition so that carbonization, which is a common fault of engines of the said type, will be substantially eliminated.

To the attainment of this object, according to the present invention an engine of the type referred to is characterized by the combination of a member heated by the heat of combustion in the interior of the (or each) cylinder and adapted to vaporize heavy fuel admitted to said cylinder in contact with said member, means for preheating said heavy fuel before its admission to the, or each, cylinder and means for preventing the whole or a portion of the heavy fuel passing to said pre-heating means whereby the temperature of said fuel can be controlled according to the load on the engine.

The last mentioned means preferably consists of a bye-pass valve whereby the whole or a portion only of said fuel may be caused to pass through said pre-heating means on its way to the engine so that the fuel may be admitted to the engine either in fully or partially heated or cold condition according to the load on the engine.

In one construction of the engine, comprising light and heavy oil pumps, the bye-pass valve is combined with means acting to cut off the light fuel supply and turn on the heavy fuel supply, while in another construction, in which fuel pumps are not used, said bye-pass valve is operably connected to a throttle valve for the air which passes into the cylinder with the heavy fuel.

As aforesaid, both light and heavy fuel pumps may be used, but when such pumps are not used I prefer to draw the heavy fuel into the engine cylinder by suction created around a heavy fuel outlet which may, for example, consist of a nozzle or jet projecting into a passage formed in a member secured to the head of the cylinder, said passage communicating, at one end, with the interior of the cylinder through a vaporizing member, which is open at both ends. The said passage may communicate directly with the atmosphere or with the crank case of the engine according as to whether the engine is of the four-stroke or two-stroke cycle type. A manually operable throttle valve is then disposed in said passage and a mechanically-operated fuel admission valve is arranged to put said passage into communication with the cylinder.

My invention is adapted to convert any light-fuel operated internal combustion engine of the four-stroke cycle or two-stroke cycle type into an engine capable of using a heavy fuel as its working fuel and the invention can be readily simply and cheaply applied to any existing single or multi-cylinder engine.

Reference is now made to the annexed drawings whereon are illustrated, by way of example, three constructional embodiments of my invention, and whereon:—

Fig. 1 is an end view of an engine, partly in section, in which the heavy fuel is injected on to the exterior of the hot bulb.

Fig. 2 is a sectional view of the light and heavy fuel pumps used in the engine illustrated in Fig. 1.

Fig. 3 is a sectional view of an engine of the four-stroke cycle type with my invention applied thereto; and Fig. 4 is a sectional view of an engine of the two-stroke cycle type with my invention applied thereto.

Referring firstly to Figures 1 and 2:—

A hot bulb 1 is shown projecting into the cylinder 2 of the engine, the heavy oil being injected, in a manner to be described hereafter, on to the exterior of said bulb through an injection valve 3 whose outlet end 4 is directly opposite to the hot bulb. Fuel pumps are provided both for the light, or starting, fuel and the heavy, or working, fuel, said pumps comprising a casing 5 whereto are secured downwardly projecting pump barrels 6 and 7 wherein plungers 8 and 9, respectively, are slidably arranged.

Said plungers are normally forced downwards into contact with a slidable tappet 10 by means of springs 11 and 12 and the tappet is operated by means of a cam 13 secured to the crankshaft 14 of the engine. The plunger 8 forces light fuel to the engine when the latter is being started, while the plunger 9 operates to feed the engine with heavy fuel when the engine has become sufficiently heated. Non-return valves 15 and 16 are provided for the light fuel pump, the valve 16 being adapted to control the inlet of light fuel from a supply pipe 17 and the valve 15 being adapted to control the outlet of light fuel through an outlet pipe 18. The heavy fuel pump is also provided with two non-return valves 19 and 20, the valve 19 controlling the outlet of heavy fuel through an outlet pipe 21 and the valve 20 being adapted to control the flow of heavy fuel through a pipe 22. The upper part of the sliding tappet 10 is formed, as shown in Fig. 1, with a number of steps 23 of varying height and the said tappet is turnable by means of a control lever 24.

A heating coil 26 arranged in the hot bulb 1 is secured to a member 27 which is fixed to the flange of the hot bulb, the ends of said heating coil being in communication with passages 28 and 29, formed in said member. A bye-pass valve 30 is slidably arranged in the member 27 and is formed with a passage 31 and a passage 32 at right angles to the passage 31, said valve being secured to a valve rod 33 contacting at its bottom end with an inclined plane 25 formed on the lever 24. The valve rod and valve are constantly forced downwards by means of the spring 34. The heavy fuel inlet pipe 22 leading to the inlet side of the heavy fuel pump opens out into the passage 29 in the member 27 and the outlet pipe 21 for the heavy fuel passes to the fuel injection valve 3. Said valve comprises a casing 35 secured in an aperture formed in the head of the cylinder and a part 36, provided with a central aperture 37, screwed into said casing. The injection valve is provided with a spring-pressed ball valve 38 and with an outlet nozzle or jet 4 as aforesaid. The supply pipe 18 leading from the light fuel pump also passes to the injection valve 3 while the inlet pipe 17 leads to a source of supply (not shown). The heavy fuel supply takes place from a suitable source through a pipe 39 whence it passes through the bore 40 of a member 41 screwed into the member 27, into the bore 42 of the last mentioned member.

The engine is started as usual by light fuel which is forced through the injection valve 3 by the light fuel pump 8 and is ignited by means of a sparking plug 43. When the engine is sufficiently heated, the control lever 24 is turned, simultaneously rotating the slidable tappet 10. Thus, the ends of the pump plungers 8 and 9 co-operate with lower and higher steps, respectively, on the tappet head 10, the light fuel supply being eventually cut off and the supply of heavy fuel commenced through the fuel outlet pipe 21. If the bye-pass valve 30 is in the position shown in Fig. 1 the heavy fuel first passes through the pipe 39 and thereafter through the bore 42 of the member 27 and the passage 28 in the latter and then through the heating coil 26 into the passage 29, whereafter it is forced by the pump 9 to the injection valve 3. The heavy fuel is forced through the nozzle 4 of said valve directly on to the exterior of the hot bulb 1, whereby, owing to the heat of said bulb caused by the combustion of the gaseous mixture within the cylinder, the heavy fuel is fully vaporized and is ignited by the sparking plug 43 in the usual manner.

As the control lever 24 is further turned in the same direction so as to cause the heavy fuel pump to give a larger delivery, the inclined plane 25 on said control lever moves the valve rod 33 upwards so that the upper part of the bye-pass valve 30 begins to close the fuel passage 28 in the member 27 while the horizontal passage 32 in the bye-pass valve begins to register with the passage 29 in the member 27. Some of the fuel in the bore 42 now flows through the passages 31 and 32 in the valve 30 and through the passage 29 into the inlet pipe 22 leading to the heavy fuel pump 9. As the rotation of the control lever 24 continues, the passage 28 is ultimately entirely cut off from the bore 42 of the member 27 and instead of passing through the heating coil 26 all the heavy fuel now passes directly from the supply source through the passages 31 and 32 in the bye-pass valve 30 into the passage 29, whence it flows to the heavy fuel pump without being previously heated by passage through the heating coil. If the control lever is rotated in the opposite direction the bye-pass valve 30 again begins to move downwards until a point is reached when the passage 28 and the bore 42 once more communicate with each other and the heavy fuel flows through the heating coil 26 before it reaches the heavy fuel pump.

A modified form of the present invention is shown in Fig. 3 applied to a four-stroke cycle engine, said engine being provided with a vaporizing member 1 which is formed with an open inner end 44 and with exterior fins 45 projecting into the cylinder. A heating coil, corresponding to the heating coil 26, is not disposed within the vaporizing member 1, but a heating box 46, which is more particularly described hereafter, is disposed in intimate contact with the engine exhaust pipe 47. An admission box 48 is provided at the top of the cylinder, a branch 49 thereof being arranged within the vaporizing member 1. Said admission box is formed with an axial passage 50 communicating directly with the atmosphere and with the bore 51 of the branch 49, which latter is formed at its outer end with a valve seat 52 with which an admission valve 53 is adapted to co-act. The stem 54 of said valve is guided in a guide 55 projecting centrally into the bore 51 of the branch 49 and is secured at its upper end to a rocking lever 56 which is operated by a rod 57 connected to a projecting piece 58 secured to the inlet valve tappet 59 which operates an existing inlet valve 60. A manually operable throttle valve 61 is rotatably mounted in the axial passage 50 of the admission box 48. In this construction, the light and heavy fuel supply pumps are not used. A member 62 is secured to the end of the injector box 48, said member comprising a passage 50ª, registering with the passage 50, and a constant level chamber 63, a passage 64 leading from the latter to the bore of a fuel nozzle 65 having a fuel jet 66 at its upper end projecting into the passage 50ª.

As in the preceding construction, a bye-pass valve 30 is also provided and formed with right-angled passages 31 and 32, but in this case the lower end of the bye-pass valve rod 33 contacts with a turnable cam 67 mounted on a shaft 68 and adapted to be angularly adjusted relatively to the shaft 68 by means of an adjusting screw 69. A lever 70 secured to the shaft 68 is connected by means of a rod 71 to the operating lever 72 of the throttle valve 61 in the axial passage 50.

This engine is started as usual by light fuel admitted through the existing induction valve 60 operated by a rotatable cam 72 and means (not shown) are provided for changing over from light to heavy fuel when the engine is sufficiently heated, said fuels being stored in separate tanks.

When the throttle valve 61 is opened atmospheric air rushing through the passages 50ª and 50 creates a suction around the fuel jet 66 and the fuel is drawn through said jet into the passage 50. The admission valve 53 is moved away from its seat 52 at pre-determined intervals by the cam 72, when it is desired to introduce the mixture of air and heavy fuel into the cylinder, through the rod 57 and rocking lever 56, the induction valve 60 continuing in its operation whether the light fuel supply is cut off or not. The mixture of air and heavy fuel coming in contact with the hot walls of the vaporizing member 1 is fully vaporized and the explosion of the charge takes place in the usual manner by means of a sparking plug (not shown). The heavy fuel passes from the tank referred to through the pipe 39 into the bore 42 of the member 27 and if the bye-pass valve 30 is in the position indicated in Fig. 3 said fuel will then pass into the heating box 46 and thus through the pipe 73 into the constant level chamber 63. The fuel passes from said chamber through the passage 64 into the fuel nozzle 65 and out through the fuel jet 66, being heated in its passage from above the bye-pass valve to said jet by the heating box 46. When, however, the throttle valve 61 is more fully opened the bye-pass valve is moved upwards, owing to the lower end of the rod 33 contacting with the cam 67, until, as the opening of the throttle valve is continued, a point is reached at which the top of said bye-pass valve completely closes the entrance to the interior of the heating box while the horizontal passage 32 in said valve registers with a passage 74 in the member 27. Thus, instead of passing through the heating box on its way to the constant level chamber 63, the heavy fuel now passes through the passages 31 and 32 in the bye-pass valve into the passage 74, wherefrom the fuel passes into said constant level chamber. It will be understood that the reverse action takes place when the throttle valve 61 is closed. As aforesaid, the cam 67 is adjustable about the shaft 68 by means of the adjusting screw 69 whereby the initial setting of said valve may be altered. The main supply of air takes place through the existing induction valve 60, although the supply of light fuel through said valve is shut off as aforesaid.

In Fig. 4 the invention is shown applied to a two-stroke cycle engine, the constructional details of this engine being substantially the same as that illustrated in Fig. 3 with certain exceptions which are hereafter referred to. Instead of the axial passage 50 in the admission box 48 and the passage 50ª in the member 62 being connected directly to the atmosphere, said passages are connected to the transfer passages 75 and 76 of the engine by means of a pipe 77 and a rotary valve 78, formed with a central passage 79, is adapted to open or close communication between the crank case of the engine and a passage 80 in a member 81 wherewith the pipe 77 communicates. In the position shown in Fig. 4, air from the crank case can pass through the passage 79 in the rotary valve 78 into the pipe 77. Fuel entering the bore 42 of the member 27 from the inlet pipe 39 will, if the bye-pass valve 30 is in the position indicated in Fig. 4, flow through the pipe 82 into the heating box 46 arranged on the engine exhaust pipe 47 and will flow therefrom through the pipe 83 into the constant level chamber 63 on its way to the fuel nozzle 65. If, however, the throttle valve 61 in the passage 50 is more fully opened the rod 33 of the bye-pass valve 30 and the valve itself will be raised by the cam 67 as in the last preceding example, so that when the horizontal port 32 in the bye-pass valve 30 registers with a passage 84 in the member 27 the fuel, instead of passing through the pipe 82, flows through the ports 31 and 32 in the bye-pass valve and through the passage 84 into a pipe 85 communicating with the pipe 83. As there is no induction valve in the engine illustrated in Fig. 4 the fuel admission valve 53 is operated through the rocking lever 56 and rod 57, the bottom end of the latter connecting with a slidable tappet 86 operated by means of a cam 87 secured to the crankshaft 88 of the engine. The operation and control of this engine is exactly the same as that of the engine described above but it should be noted that more or less air as required can be deflected from the crankcase into the pipe 77 by means of the rotary valve 78.

As will be seen, the invention can be very readily and cheaply applied to any existing engine whether of the four-stroke cycle or two-stroke cycle type and in addition to the thorough atomization to the fuel which is assured by the rush of air past the fuel jet 66 a very perfect vaporization of the fuel takes place by means of the vaporizing member 1 so that carbon deposited in the cylinder is substantially eliminated.

It will be understood that the bye-pass valve 30 provides means whereby the temperature of the heavy fuel injected into the engine can be conveniently regulated according to the load on the engine, said valve being adapted to deflect more or less of said fuel to the heating means therefor according as to whether the load on the engine decreases or increases.

In order to provide a greater rush of air past the fuel jet 66 I may provide supercharging means for forcing air through the passages 50 and 50ª.

Having now fully described my invention what I claim and desire to secure by Letters Patent is:—

1. In an internal combustion engine, a member heated by the heat of combustion in the interior of the cylinder and adapted to vaporize heavy fuel admitted to said cylinder in contact with said member, means for governing the admission of fuel and air to the cylinder, a passage for fuel and air leading to said governing means, throttle means controlling said passage, means for pre-heating the fuel before its admission to said passage, means for regulating the proportion of fuel passing said pre-heating means, and means interconnecting said throttle means and regulating means so as to vary the temperature of the fuel proportionately with the load on the engine.

2. In an internal combustion engine, an open-ended member projecting into the cylinder and heated by the heat of combustion therein, said member being adapted to vaporize heavy fuel admitted into its interior, means for governing the admission of fuel and air to the cylinder, a passage for fuel and air leading to said governing means, throttle means controlling said passage, means for pre-heating the fuel before its admission to said passage, means for regulating the proportion of fuel passing said pre-heating means, and means interconnecting said throttle means and regulating means so as to vary the temperature of the fuel proportionately with the load on the engine.

3. In an internal combustion engine, a member heated by the heat of combustion in the cylinder and having one end opening out into the interior of the latter, said member being adapted to vaporize heavy fuel admitted into its interior, a passage, communicating with the interior of said member, through which the fuel and air are induced into the member, throttle means for controlling said passage, means within said member for controlling the admission of the fuel and air thereinto, means for pre-heating said fuel prior to its admission into the passage, bye-pass means for preventing the whole, or a portion only, of said fuel passing to said pre-heating means, and means interconnecting said throttle means and said bye-pass means so as to regulate the temperature of the fuel in accordance with the load on the engine.

4. In an internal combustion engine, an open-ended member projecting into the cylinder and heated by the heat of combustion therein, said member being adapted to vaporize heavy fuel admitted into its interior, means for governing the admission of fuel and air to the cylinder, a passage for fuel and air leading to said governing means, throttle means controlling said passage, means for pre-heating the fuel before its admission to said passage, means for regulating the proportion of fuel passing said pre-heating means, and means interconnecting said throttle means and regulating means so as to vary the temperature of the fuel proportionately with the load on the engine, and means for adjusting the initial setting of said regulating means.

5. In an internal combustion engine, a member heated by the heat of combustion in the cylinder and having one end opening out into the interior of the latter, said member being adapted to vaporize heavy fuel admitted into its interior, means, communicating with the interior of said member, through which the fuel and air are induced into the member, throttle means for controlling the passage of fuel and air through said last mentioned means, means within said member for controlling the admission of the fuel and air thereinto, means for pre-heating said fuel prior to its admission into the means through which the fuel and air are induced, bye-pass means for preventing the whole, or a portion only, of said fuel passing to said pre-heating means so as to regulate the temperature of the fuel in accordance with the load on the engine, means for varying the initial setting of said bye-pass means, and means for interconnecting the bye-pass means and the throttle means.

6. In an internal combustion engine, a hot bulb projecting into the interior of the cylinder and having one end opening out into the latter, said bulb being heated by the heat of combustion in the cylinder and adapted to vaporize heavy fuel admitted into contact with the interior walls of the bulb, a passage connecting the interior of said hot bulb to the atmosphere, means for supplying the heavy fuel to said passage, throttle means for controlling the supply of fuel and air to said hot bulb through said passage, valve means for controlling the admission of fuel and air into said hot bulb, means for pre-heating the heavy fuel prior to its admission to said fuel supplying means, bye-pass means for preventing the whole, or a portion only of, said fuel passing to said pre-heating means, and means for interconnecting said throttle means and said bye-pass means, so as to regulate the temperature of the fuel in accordance with the load on the engine.

7. In an internal combustion engine, a hot bulb projecting into the interior of the cylinder and having one end opening out into the latter, said bulb being heated by the heat of combustion in the cylinder and adapted to vaporize heavy fuel admitted into contact with the interior walls of the bulb, a passage connecting the interior of said hot bulb to the atmosphere, a fuel jet for supplying the heavy fuel into said passage, a throttle valve for controlling the supply of fuel and air to said hot bulb through said passage, a valve for controlling the admission of fuel and air into said hot bulb, a heating member, arranged in intimate contact with the engine exhaust pipe, adapted to heat the heavy fuel before it passes to said fuel jet, a bye-pass valve co-operating with said heating member so as to prevent the whole or a portion only of the heavy fuel passing thereto, means for interconnecting said bye-pass valve to said throttle valve so that the temperature of the fuel can be regulated in accordance with load on the engine, and means for initially setting the position of said bye-pass valve.

In testimony whereof I affix my signature.

DONALD SCOTT.